United States Patent
Keller et al.

(10) Patent No.: US 7,035,546 B2
(45) Date of Patent: Apr. 25, 2006

(54) OPTICAL WIRELESS MULTIPORT HUB

(75) Inventors: Robert C. Keller, Plano, TX (US); Jose Luis Melendez, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 600 days.

(21) Appl. No.: 09/895,712

(22) Filed: Jun. 29, 2001

(65) Prior Publication Data

US 2002/0033981 A1 Mar. 21, 2002

Related U.S. Application Data

(60) Provisional application No. 60/234,081, filed on Sep. 20, 2000, provisional application No. 60/285,466, filed on Apr. 20, 2001.

(51) Int. Cl. *H04B 10/00* (2006.01)

(52) U.S. Cl. .................... 398/131; 378/118; 378/170; 378/169

(58) Field of Classification Search ............... 398/118, 398/128, 129, 130, 131, 168, 170, 169
See application file for complete search history.

(56) References Cited

U.S. PATENT DOCUMENTS 4,731,879 A * 3/1988 Sepp et al. ................ 398/170
6,233,088 B1 * 5/2001 Roberson et al. ........... 359/291
6,624,916 B1 * 9/2003 Green et al. ................ 398/169
2004/0046736 A1 * 3/2004 Pryor et al. ................ 345/156

* cited by examiner

*Primary Examiner*—Agustin Bello
*Assistant Examiner*—Nathan Curs
(74) *Attorney, Agent, or Firm*—William B. Kempler; W. James Brady, III; Frederick J. Telecky, Jr.

(57) ABSTRACT

An optical communication transmitter (13), receiver (15), and transceiver (17) having distinctive retro-reflective elements (30) and/or reflectivity that can be modulated. In one embodiment, the retro-reflective elements (30) can have different shapes or patterns (32), irrespective of rotation or size. In another embodiment, the retro-reflective elements can have their reflectivity modulated (42) to have a distinctive pattern in time. The solution also provides the capability to direct a remote optical receiver (15) to an available port (17) with an appropriate FOV. In the case where retro-reflective elements are only shape distinctive, a method may be used to direct the remote OWLink (15) to an appropriate port (17) of the hub (54). In addition to the hub ports (17) used for data links, additional hub ports called command ports (60) are added that are only used during the initial link setup of remote units. The hub (54) contains enough command ports (60) such that one command port covers each possible FOV. All command ports contain the same retro-reflective element shape that is very distinct from other hub shapes, e.g. the largest.

11 Claims, 3 Drawing Sheets

OPTICAL WIRELESS MULTIPORT HUB

CROSS REFERENCE TO RELATED APPLICATIONS

Cross reference is made to the following co-pending patent applications, each being assigned to the same assignee as the present invention and the teachings included herein by reference: U.S. Patent application Ser. No. 60/234,081, entitled "Optical Wireless Network with Direct Optical Beam Pointing" filed Sep. 20, 2000; U.S. Patent application Ser. No. 60/285,466, entitled "Methods for Embedding Control Information Within an Optical Wireless Link" filed Apr. 20, 2001; and U.S. patent application Ser. No. 09/839,690 now abandoned entitled "Methods for Separating Data from Multiple Freespace Optical Sources Directed at Closely Spaced Optical Receivers" filed Apr. 20, 2001.

FIELD OF THE INVENTION

The present invention is generally related to communication systems, and more particularly to high data rate unidirectional and bidirectional wireless optical point-to-point systems.

BACKGROUND OF THE INVENTION

A point-to-point Optical Wireless Link (OWLink) using collimated beams of light to wirelessly transfer high speed data (=>100 Mbps) is currently being developed by applicant. As depicted in FIG. 1, a uni-directional OWLink 10 consists of one unit 13 including a transmitter with DSP-based control electronics 40 that transfers information through an optical beam 16 to a second unit 15 including a receiver. In a bi-direction communication system, as shown in FIG. 2, a bidirectional OWLink unit 17, called a port in this application, contains both a transmitter 13 and a receiver 15. The OWLink port 17 also contains a data interface 19 that is adapted to be connected to a remote data source and sink of data that is transmitted across the optical wireless link. The data interface 19 can be a serial interface such as Ethernet, USB, RS232, telephone modem, or a parallel interface such as a computer bus (PCI, PCMCIA, Cardbus). The source and sink of data could be a computer, local area network (LAN), personal digital assistant, LAN switch, or any device that can generate or receive data.

The transmitter 13 includes a light source such as a laser diode 11 that emits a collimated or anisotropic light beam 12, a data interface input 21 connected to electronics for modulating the light with data, a 2-axis analog micromirror 14 for selectively directing the reflected light beam 16, and a photodetector 18 for detecting when light is returned to the transmitter during the initial alignment. The micromirror 14 can selectively point the collimated light source 12 in any direction within its field of view (FOV), such as within 5 degrees with respect to a nominal direction.

The receiver 17 consists of a data photodiode 20 with optics 22 for collecting the impinging light, four (4) "positioning" photodiodes 24 surrounding the collection optics 22, and a retro-reflective (corner cube) element 26. Retro-reflective elements alone are well known in the art—examples include street sign material and bicycle reflectors. The data photodiode 20 is connected to a data interface output 23. The "positioning" photodiodes 24, each being equal distance from the center of the collection optics 22, provide information on how well an incoming beam 16 is aligned to the collection optics 22 by comparison of the intensity of incoming light on each photodiode 24. The use of the collection optics 22 increases the area of light that can be directed to hit the data photodiode 20 while restricting the FOV of received light. Ideally, the FOV of the transmitter 13 and receiver 15 are the same. The retro-reflective element 26 has the property of reflecting incoming light back upon itself, thereby returning part 28 of the incoming light signal not incident to the optics 22 in the direction of its transmitter. The teachings of pending commonly assigned patent application Ser. No. 60/234,081, entitled, "Optical Wireless Network with Direct Optical Beam Pointing" discussing retroreflectors for acquisition of a point-to-point optical wireless link is incorporated herein by reference.

The transmitter 13 and receiver 15 for a port 7 do not necessarily need to be physically next to each other. However, they share a data interface 19, such as the same Ethernet cable, RS232 cable, or phone line.

The method described above for establishing a single point-to-point optical wireless connection incurs difficulties when multiple receivers 15 lie within a transmitter's FOV, since the retro-reflector 26 at each receiver will return light the same transmitter. This would be the case for a hub consisting of a collection of multiple ports in close proximity. In addition, it is important that the process of establishing new links interferes as little as possible with already established links. Moreover, in the process of establishing a new link between a hub and a remote port, the hub must be able to direct the remote port to connect to one of its unused ports with an appropriate FOV.

SUMMARY OF THE INVENTION

The present invention achieves technical advantages as a receiver having distinctive retro-reflective elements and/or reflectivity that can be modulated.

In one embodiment, the retro-reflective elements can have different shapes or patterns, irrespective of rotation or size. In another embodiment, the retro-reflective elements can have their reflectivity modulated to have a distinctive pattern in time.

The second part of the solution provides the capability to direct the remote receiver to an available port with an appropriate FOV. In the case where the retro-reflector is modulated in time, a hub port may have two distinctive modulation patterns depending on whether it is "busy", i.e. already has established a point-to-point connection, or "free". The "busy" pattern may be as simple as always off. The remote OWLink transmitter, upon seeking a free port, searches its FOV until it finds a free hub port. If the retro-reflective element has a FOV restricted to its transmitter's FOV, then the free hub port will always be able to find the remote OWLink port. This hub to remote link can be readily established by sending information from the remote OWLink to the hub using the transmitter light.

In the case where hub ports are only shape distinctive, another method may be used to direct the remote OWLink to an appropriate hub port. In addition to the hub ports used for data links, additional hub ports called "command ports" are added that are only used during the initial link setup of remote units. The hub contains enough command ports such that one command port covers each possible FOV. All command ports contain the same retro-reflective element shape that is very distinct from other hub shapes, e.g. the largest.

BRIEF DESCRIPTION OF THE DRAWINGS

FIG. 3 illustrates retro-reflective elements having different shapes and sizes;

DETAILED DESCRIPTION OF THE PREFERRED EMBODIMENT

Figure 1:
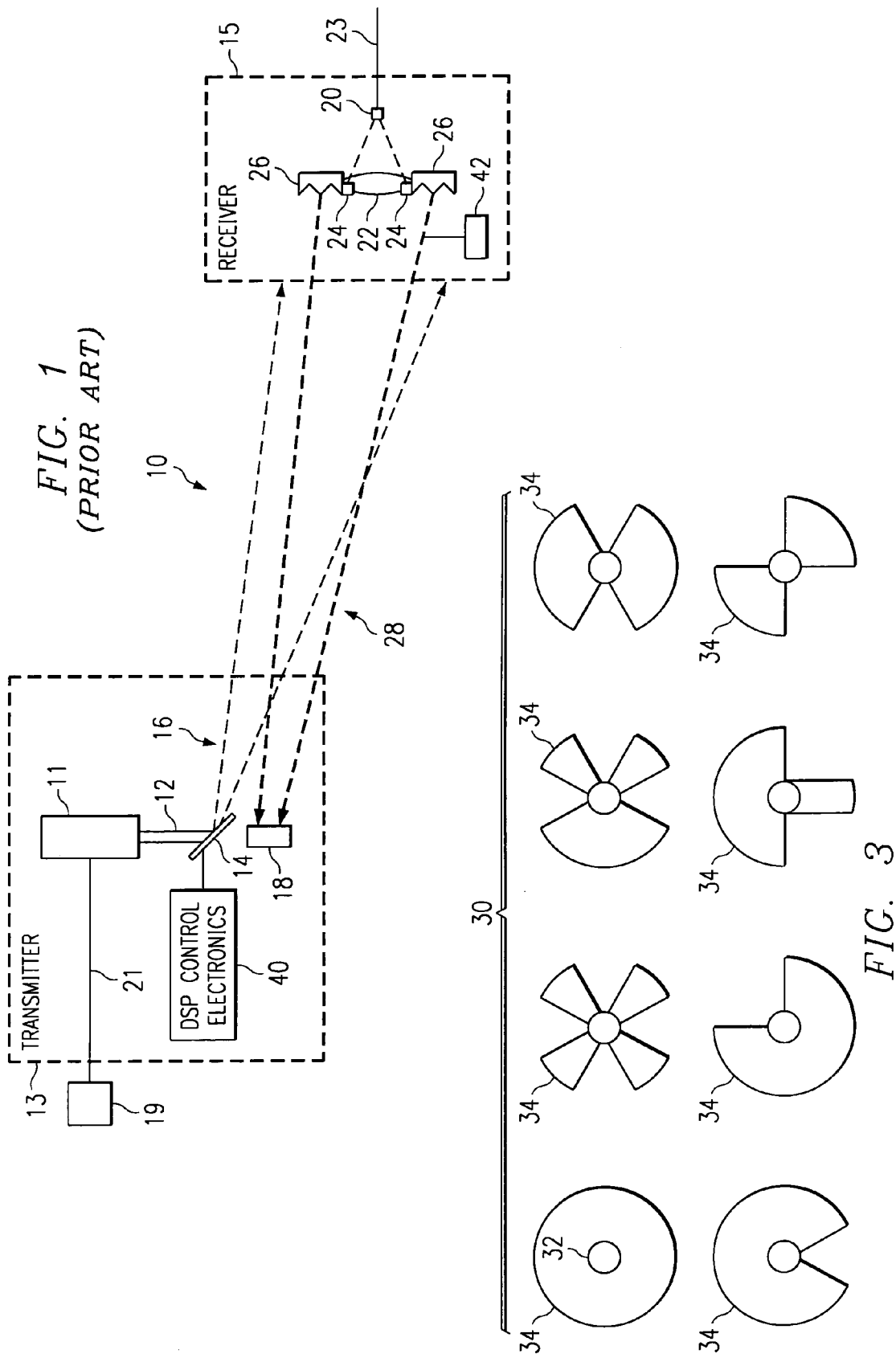
FIG. 1 is an illustration of a unidirectional point-to-point optical wireless link using collimated beams of light to transfer data.
Figure 2:
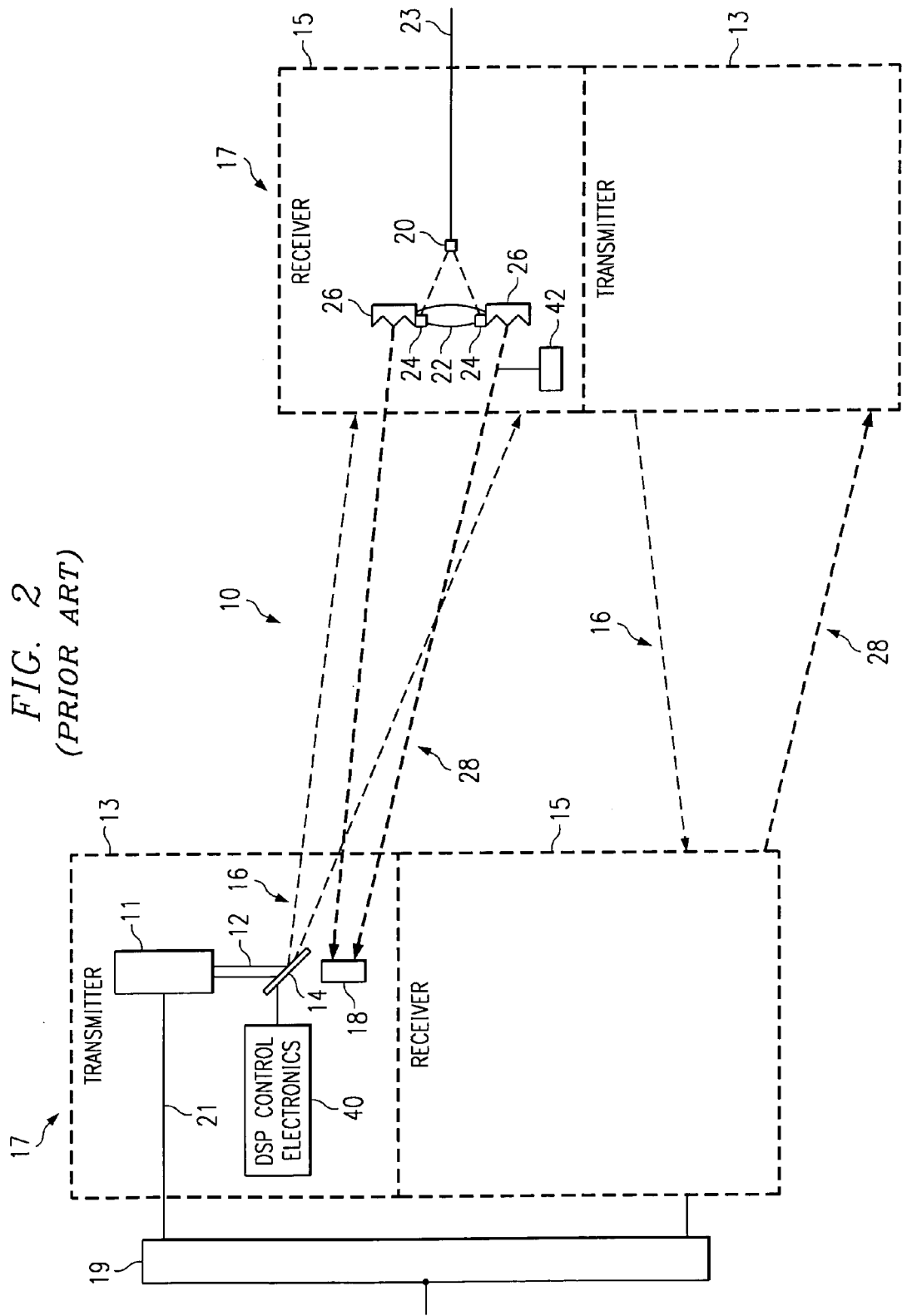
FIG. 2 is an illustration of a bidirectional link including transceiver parts.

The first advantageous part of the solution provides a plurality of distinctive retro-reflective elements 30 about the optics 22 in the receiver 15 for each port in the hub. There are several solutions for creating distinctive retro-reflector elements 30. First, the retro-reflective elements 30 can have different shapes or patterns, and several examples of this are shown in FIG. 3. For each element 30 shown, the central circle 32 depicts an opening for the collection optics 22 for the associated receiver photodiode 20 and shaded portion 34 is the retro-reflective element. It is assumed that the actual corner-cube elements in the retro-reflective elements 30 are much smaller than the element itself. Advantageously, each shape shown in FIG. 3 has the property that it is distinctive from the other patterns, irrespective of rotation, translation or size.

DSP-based electronics and firmware 40 are used to controllably rotate the micromirror 14 so that the collimated beam 12 is responsively aligned toward the receiver of the remote OWLink port. Initial alignment in the point-to-point bi-directional OWLink system is obtained by rastering reflected the collimated beam 16 across the field of view of the port's transmitter. When the collimated beam 16 is aligned to a second port's receiver lying within the first port transmitter's field of view during the raster sequence, part of the light beam 16 is returned to the first port's transmitter by at least one retro-reflective element 30. The returned light 28 is detected by the photodetector 18 at the transmitter. The initial transmitter alignment is completed by holding the position of the micromirror 14 corresponding to the maximum detected returned light distribution detected by photodiode 18.

The transmitter then begins sending information to the remote receiver via the beam 12. When transmitters for both ports are aligned to their counterpart's receiver, link maintenance information is transmitted across the optical beam 12 that includes information on the light intensity sensed by the 4 positioning photodiodes 24. This information is used by the DSP-based electronics 40 to optimize and maintain the transmitter to receiver alignment, such as disclosed in copending commonly assigned U.S. Patent application Ser. No. 60/285,466, entitled "Methods for Embedding Control Information Within an Optical Wireless Link", the teachings of which are included herein by reference.

Figure 4:
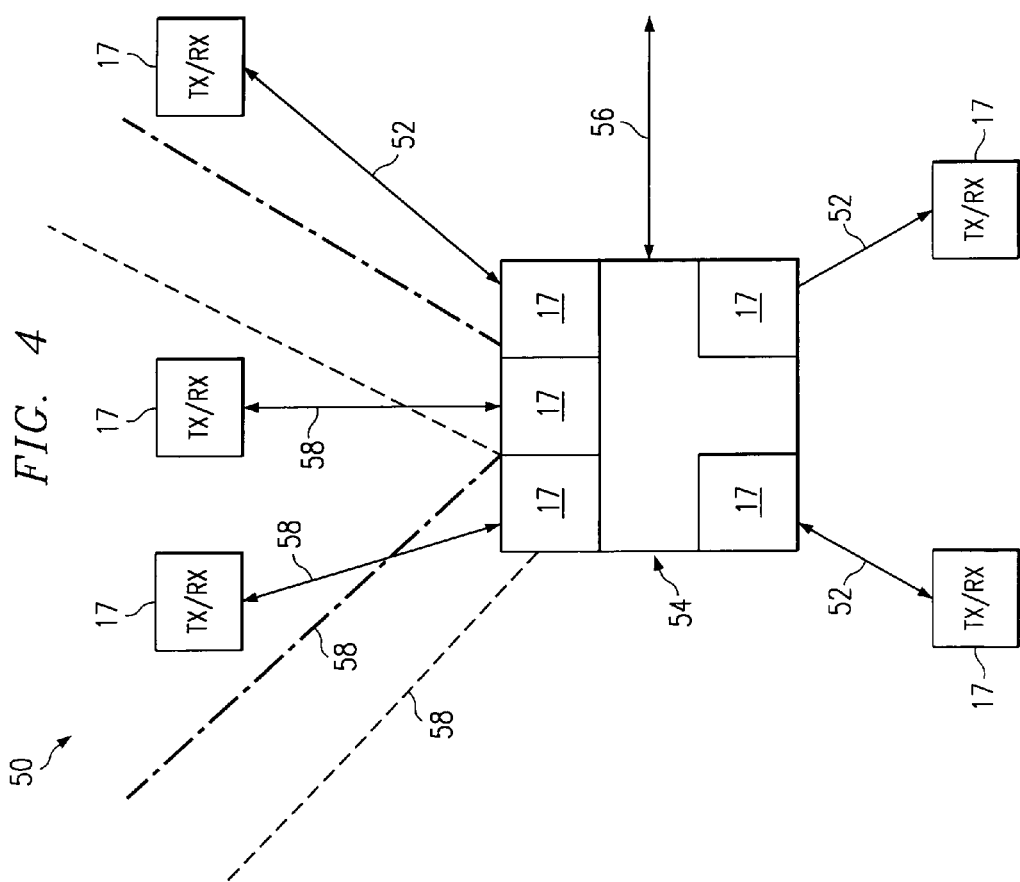
FIG. 4 is a hub-and-spoke architecture where the remote units have overlapping FOV's with respect to the hub units.

There are advantages in combining multiple point-to point optical links in a "hub and spoke" architecture, as shown at 50 in FIG. 4, where one port 17 of each link 52 is in close proximity to other ports 17, i.e. forming a hub generally shown at 54. One advantage of this architecture is that the data from each of the multiple optical wireless links 52 can be combined at the hub 54 and connected on a backbone network 56 that can have higher bandwidth, e.g. Fast Ethernet (100 Mbits/s) OWLinks connected to a Gigabit Ethernet (1 Gbits/s) backbone. Another advantage of the 54 hub is that several ports 17 can be installed at once, thereby lowering the cost of provisioning multiple optical wireless links. It is envisioned that more than several ports 17 at the hub 54 will have overlapping FOVs 58, so that the density of remote ports can exceed one per port FOV 58. Since the light from the collimated light source is localized, the light from any two remote transmitters directed at different ports in the hub 54 can be separated by placing hub ports with overlapping FOVs 58 far enough apart such that the two light distributions do not overlap, such as disclosed in copending commonly assigned U.S. patent application Ser. No. 09/839,690, entitled "Methods for Separating Data from Multiple Freespace Optical Sources directed at closely Spaced Optical Receivers", the teachings of which are included herein by reference.

The transmitter 13 associated with the incoming light detects the shape of the retro-reflective element 30 at the receiver 15 by rastering and recording the returned light signal. When the cross sectional area of the incoming light distribution is larger than the retro-reflective element 30, the retro-reflective element pattern can still be detected as a change in the returned light intensity vs. position as long as the incoming light distribution has a simple maximum (e.g. a Gaussian distribution). In this case the difference in signal vs. position will be a small compared to the total signal returned, but the shape can still be detected by comparing the differences in signal vs. position.

Another advantageous system and method for creating distinctive retro-reflective elements is to modulate the reflectivity of the retro-reflector 30 in a distinctive pattern in time. This time domain solution can be accomplished, for instance, by use of a mechanical shutter 42 being selectively extendable in front of the retro-reflective element 30 that is opened or closed by a device, such as a solenoid. Other possible techniques for modulating the retro-reflector include using an electro-chromatic material, LCD, or by fabricating an active retro-reflector (e.g. where one side can move in and out of alignment). The time pattern could be simple like a distinct on-off frequency, or contain a distinctive code. Both distinctive shapes and modulation patterns can be used together if desired.

The second advantageous part of the solution provides to direct the remote receiver 15 to an available port 17 at hub 54 with an appropriate FOV as shown in FIG. 4. In the case where the retro-reflector 30 is modulated in time, a port 17 at hub 54 may have two distinctive modulation patterns depending on whether it is "busy", i.e. already has established a point-to-point connection, or "free". The "busy" pattern may be as simple as always off. The transmitter 13 of the remote port 17, upon seeking a free port 17, searches its FOV until it finds a free hub port XX. If the associated retro-reflective element 30 has a FOV restricted to its transmitter's FOV, then the free hub port will always be able to find the remote port. This hub-to-remote link can readily established by sending information from the remote port to the hub using the transmitter light.

If, however, the retro-reflective element 30 of the hub port's transmitter can be seen by several remote ports outside of the FOV of the hub port's transmitter, the remote port 17 waits for the hub port transmitter to find it. If the remote OWLink is not within a particular searched hub port transmitter FOV, then the hub port will never find the remote port, and after a certain amount of time, the remote port 17 proceeds to look for another open hub port. This continues until the remote port 17 finds a free hub port with an appropriate FOV.

Figure 5:
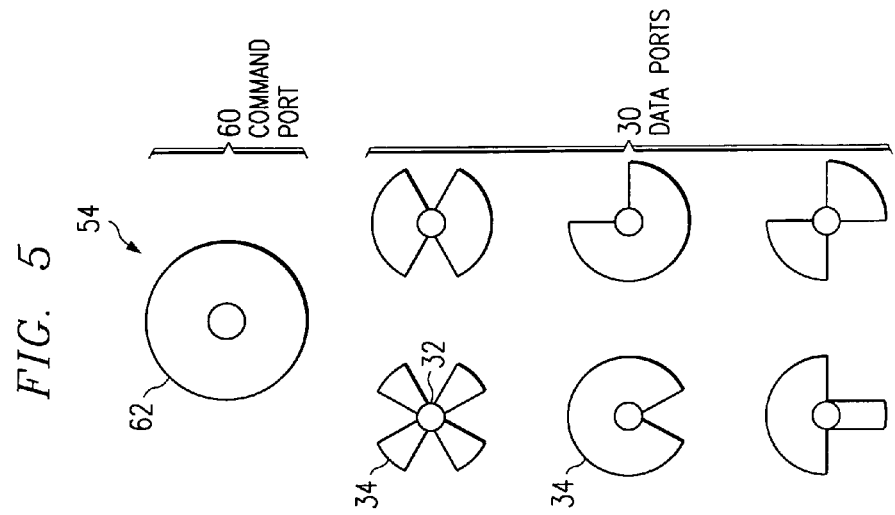
FIG. 5 is an illustration of a hub part having a command port adapted to facilitate initial setup of remote units.

In the case where ports 17 of hub 54 are only shape distinctive, another method may be used to direct the remote port 17 to an appropriate port 17 of hub 54. In addition to the hub ports 17 used for data links, additional hub ports called "command ports" 60 are provided at hub 54 that are only used during the initial link setup of remote units, as shown in FIG. 5. The hub 54 contains enough command ports 60 such that one command port 60 covers each possible FOV of the hub 54. All command ports 60 contain the same retro-reflective element shape and that is very distinct from other hub 34 shapes of the data ports, e.g. the largest.

The distinctive retro-reflective element 62 of the command port 60 makes it easy to find by the remote port's transmitter 13. A two way optical wireless link is then established using the method described above. The hub port then responsively transfers information via the command port 60 to the remote OWLink 17 providing the characteristics (retro-reflective element shape) of the free hub port for which it should establish a data link. Other information, such as the location of the appropriate data hub relative to the command port, could also be sent by the command port 60 to help the remote port 17 establish the data link quickly can also be transferred.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. An optical wireless communication system, comprising:
   a first port having a first transmitter adapted to transmit a first optical beam and a receiver having a first retro-reflective element positioned to receive a second optical beam;
   a second port having a receiver having a second retro-reflective element positioned to receive the second optical beam, wherein the second retro-reflective element is different than the first retro-reflective element;
   a third port having a receiver having a third retro-reflective element positioned to receive the first optical beam, wherein the first and second ports have a field of view (FOV) overlapping one another;
   wherein the first port also comprises a command port adapted to communicate with the receiver of the third port; and
   further comprising a fourth port having a second transmitter and a fourth receiver, wherein the command port is adapted to instruct the third port to communicate with a selected one of the second or fourth ports.

2. The communication system as specified in claim 1 wherein the command port is adapted to provide characteristics of a retro-reflective element associated with the first transmitter.

3. The communication system as specified in claim 1 wherein the command port is adapted to provide a location of the first transmitter relative to the command port.

4. The communication system as specified in claim 1 wherein the modulation of the first retro-reflective element is indicative of its associated operational status.

5. The communication system as specified in claim 1 wherein the first and fourth port each comprise a transceiver and together form a communication hub.

6. The communication system as specified in claim 5 wherein the communication hub is connected to a communication link.

7. The communication system as specified in claim 5 wherein the communication hub includes a command port.

8. The communication system as specified in claim 7 wherein the command port is adapted to communicate with the third port.

9. The communication system as specified in claim 8 wherein the command port is adapted to instruct the third port to communicate with a selected one of the second port or the fourth port.

10. The communication system as specified in claim 8 wherein the command port is adapted to provide a characteristic of the retro-reflective element associated with the first transmitter.

11. The communication system as specified in claim 8 wherein the command port is adapted to provide a location of the first transmitter relative to the command port.

* * * * *